United States Patent
Frolov

(10) Patent No.: US 10,835,970 B2
(45) Date of Patent: Nov. 17, 2020

(54) MITER GAUGE LOCK FOR SLIDING TABLE SAWS

(71) Applicant: Andrew Frolov, Glenview, IL (US)

(72) Inventor: Andrew Frolov, Glenview, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 1042 days.

(21) Appl. No.: 14/848,426

(22) Filed: Sep. 9, 2015

(65) Prior Publication Data

US 2016/0067802 A1 Mar. 10, 2016

Related U.S. Application Data

(60) Provisional application No. 62/047,968, filed on Sep. 9, 2014.

(51) Int. Cl.
*B23D 47/04* (2006.01)
*B27B 5/16* (2006.01)
(Continued)

(52) U.S. Cl.
CPC ............ *B23D 47/047* (2013.01); *B27B 5/165* (2013.01); *B27B 5/222* (2013.01); *B27B 25/10* (2013.01); *B27G 5/023* (2013.01)

(58) Field of Classification Search
CPC .... B23D 47/025; B23D 47/047; B23D 47/02; Y10T 83/6611; Y10T 83/863;
(Continued)

(56) References Cited

U.S. PATENT DOCUMENTS 1,509,923 A * 9/1924 Berryman .............. B60J 1/2097
292/140
1,904,602 A * 4/1933 Axe ........................ E05F 11/00
292/173

(Continued)

FOREIGN PATENT DOCUMENTS

EP 1588809 A2 10/2005

OTHER PUBLICATIONS

International Search Report and Written Opinion corresponding to PCT Application No. PCT/US2015/049128, dated Dec. 17, 2015 (16 pages).

(Continued)

*Primary Examiner* — Andrea L Wellington
*Assistant Examiner* — Samuel A Davies
(74) *Attorney, Agent, or Firm* — Maginot, Moore & Beck LLP

(57) ABSTRACT

Locking mechanisms are provided for locking the position of a miter gauge assembly to a sliding table of a table saw. The mechanisms are biased to a locking position and this bias can provide a sensible indication that the lock has been engaged. The locking mechanisms are configured to engage the guide bar of the miter gauge assembly at different locations along the length of the guide bar, particularly by engaging a series of spaced apart engagement notches. The locking mechanism thus allows the miter gauge assembly to be locked at several positions along the length of the sliding table, from a fully inboard position to a position in which the miter gauge assembly projects beyond the end of the sliding table. The locking mechanism is provided in different embodiments with manually actuated components that can be push/pull, pivoting, rotating or sliding.

12 Claims, 15 Drawing Sheets

(51) Int. Cl.
    *B27G 5/02*         (2006.01)
    *B27B 5/22*         (2006.01)
    *B27B 25/10*       (2006.01)

(58) Field of Classification Search
    CPC .......... Y10T 292/096; Y10T 292/0972; Y10T 292/0974; Y10T 292/0976; Y10T 292/0977; Y10T 292/0994; Y10T 292/1005; Y10T 292/1016; Y10T 292/102; Y10T 83/6614; B27G 5/023; B27B 5/165; B27B 5/222; B27B 25/10; Y10S 292/11; E05C 1/00; E05C 1/004; E05C 1/02; E05C 1/06; E05B 15/0086; E05B 15/10; E05B 2015/105
    USPC ............................ 83/435.12, 435.13, 522.25
    See application file for complete search history.

(56) References Cited

U.S. PATENT DOCUMENTS

| | | | | |
|---|---|---|---|---|
| 2,726,889 A * | 12/1955 | Lawson | ...................... | E05C 1/14 |
| | | | | 292/170 |
| 3,492,702 A * | 2/1970 | Stafford | ................ | F16G 11/101 |
| | | | | 182/5 |
| 4,165,668 A | 8/1979 | McCord, Jr. | | |
| 4,244,253 A | 1/1981 | Flanigan | | |
| 4,354,770 A * | 10/1982 | Block | ........................ | F16B 2/14 |
| | | | | 254/104 |
| 4,934,422 A | 6/1990 | Hempy et al. | | |
| 5,038,486 A | 8/1991 | Ducate | | |
| 5,379,669 A | 1/1995 | Roedig | | |
| 5,735,054 A | 4/1998 | Cole | | |
| 6,691,423 B2 * | 2/2004 | Fontaine | ................ | B23Q 16/06 |
| | | | | 33/471 |
| 8,479,543 B2 * | 7/2013 | Yang | ................... | E05B 65/0075 |
| | | | | 70/118 |
| 2002/0194971 A1 | 12/2002 | Park et al. | | |
| 2007/0120376 A1 * | 5/2007 | Bella | ........................ | E05B 83/32 |
| | | | | 292/163 |
| 2011/0193351 A1 * | 8/2011 | Do | ............................ | E05C 9/16 |
| | | | | 292/6 |
| 2015/0035290 A1 * | 2/2015 | McGill | ................ | E05B 17/2038 |
| | | | | 292/163 |

OTHER PUBLICATIONS

Supplementary European Search Report corresponding to European Patent Application No. 15 83 9514 (8 pages).

* cited by examiner

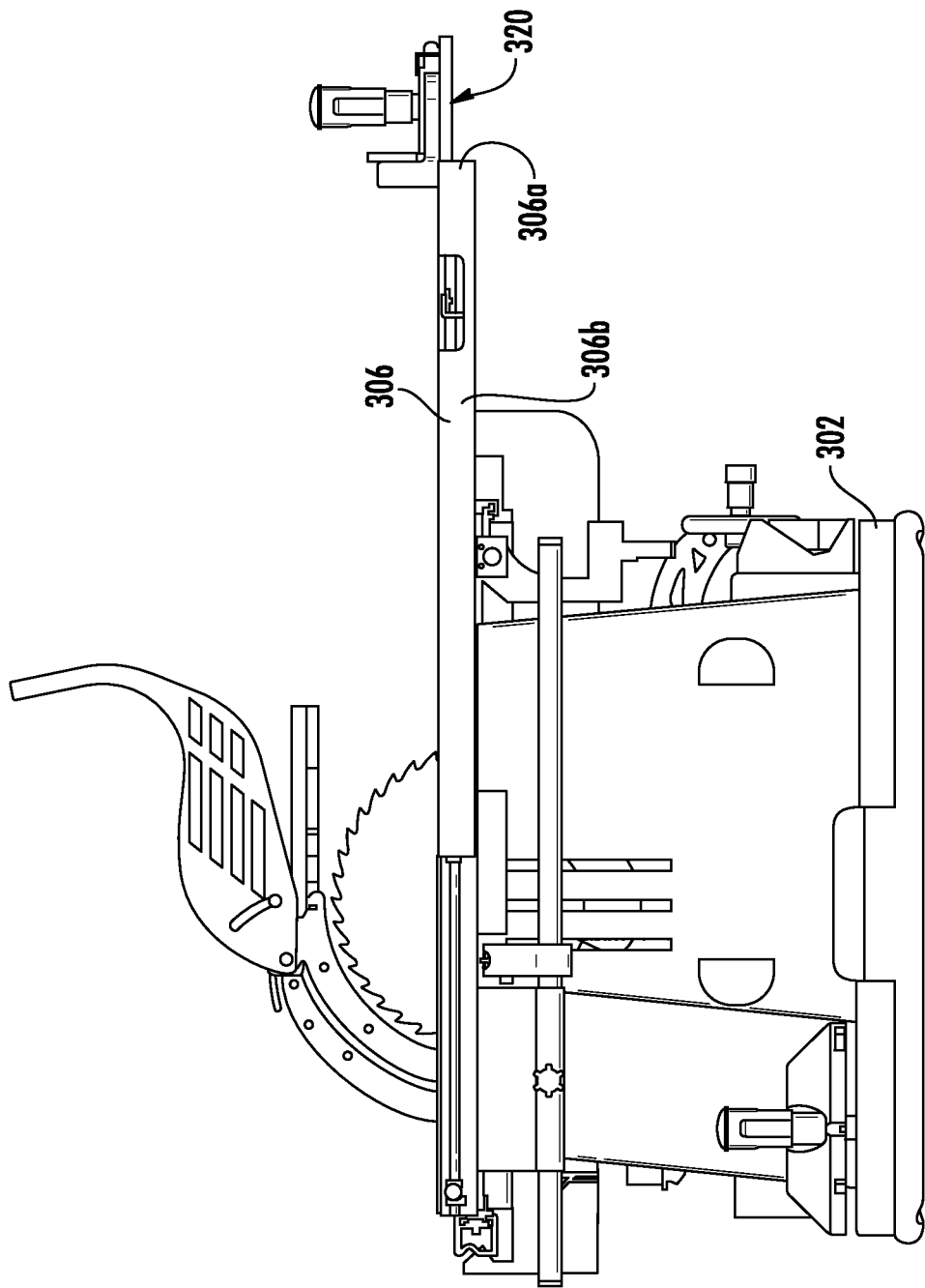

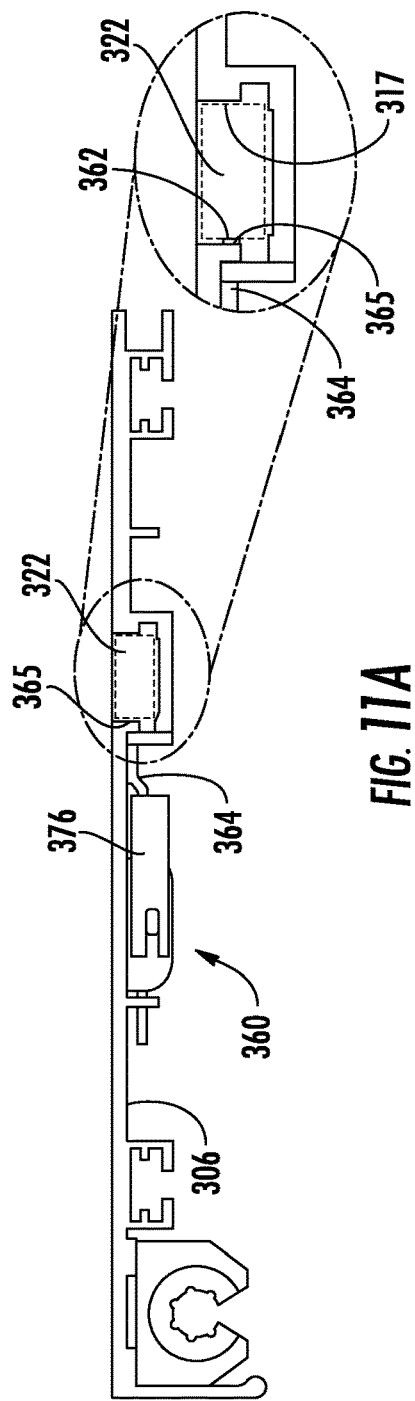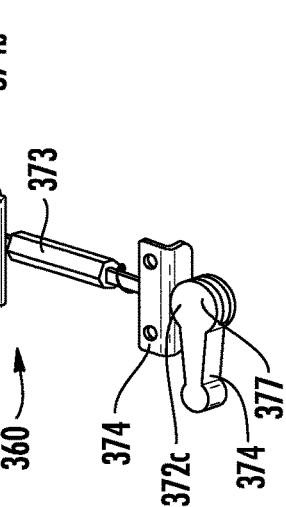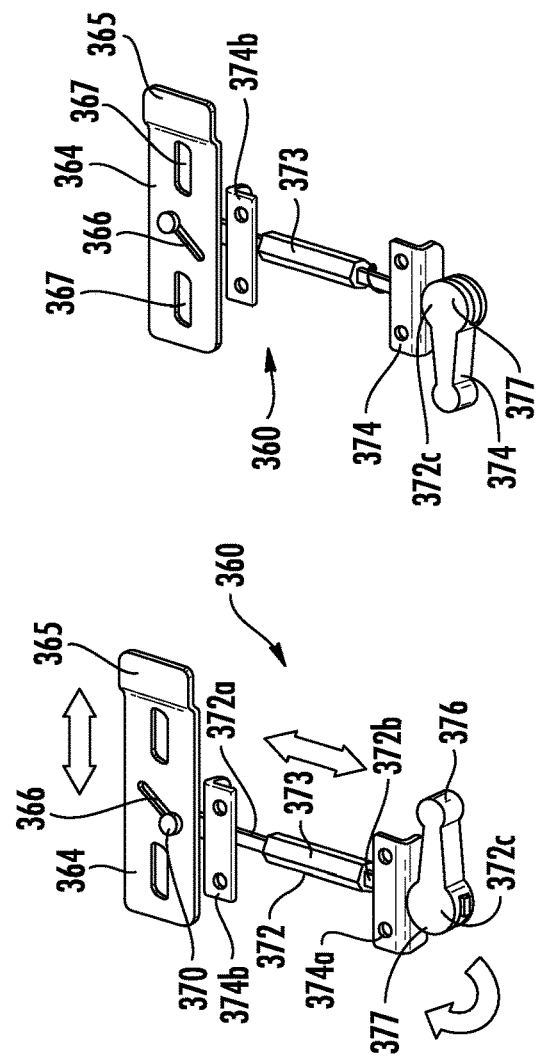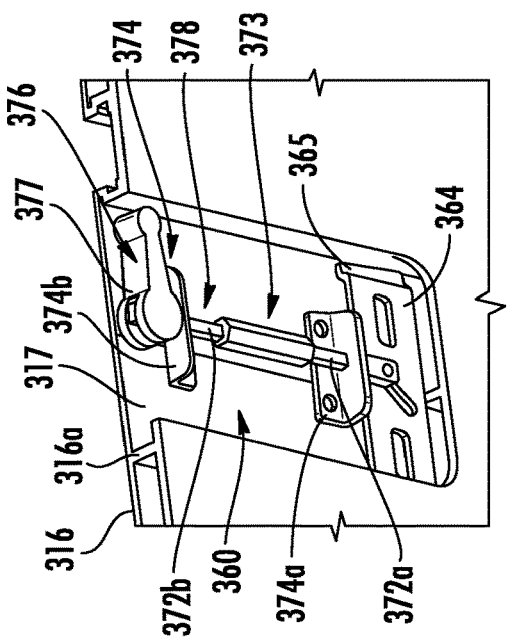

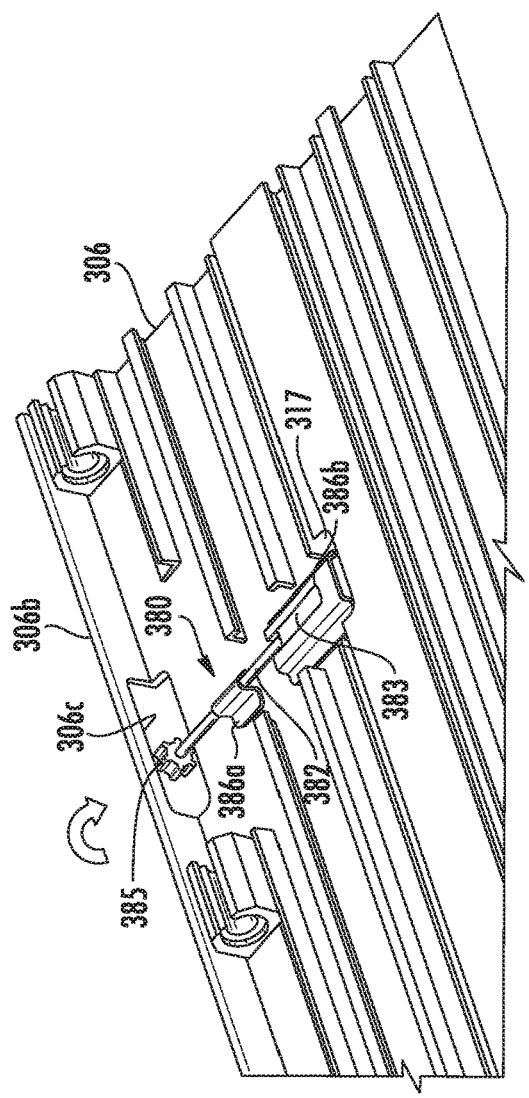
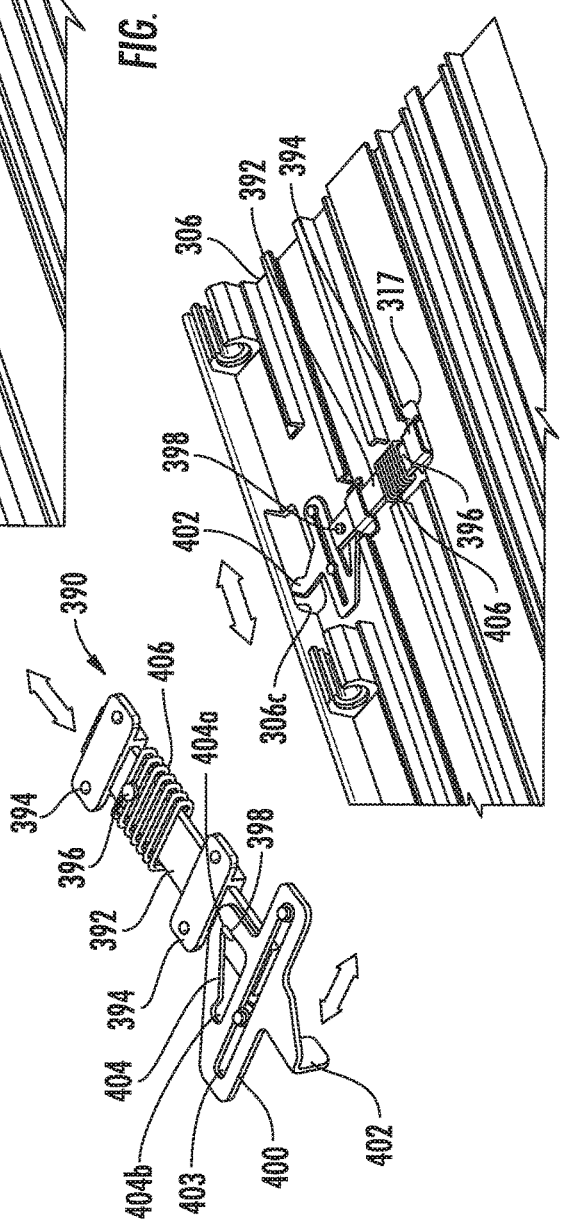

MITER GAUGE LOCK FOR SLIDING TABLE SAWS

PRIORITY CLAIM AND REFERENCE TO RELATED APPLICATION

The present application is a utility application of and claims priority to provisional application No. 62/047,968, filed on Sep. 9, 2014, the entire disclosure of which is incorporated herein by reference.

BACKGROUND

The disclosure relates to power tools and particularly to power tools integrated into a table that provides a work surface for supporting the workpiece, such as power table saws.

A number of power tools have been produced to facilitate forming a work piece into a desired shape. One such power tool is a table saw. A wide range of table saws are available for a variety of uses. Some table saws, such a cabinet table saws, are very heavy and relatively immobile. Other table saws, sometimes referred to as jobsite table saws, are relatively light and portable so that a worker can position the table saw at a job site. Some accuracy is typically sacrificed in making a table saw sufficiently light to be mobile. The convenience of locating a table saw at a job site, however, makes job site table saws very desirable in applications such as general construction projects.

Many table saws include a sliding table portion to the tool table that can be extended to accommodate larger workpieces. One problem experienced with sliding table saws is that mitered angle cuts are often difficult to make. For larger cabinetry table saws, the miter cuts can be made accurately but the miter gauge equipment is typically very expensive. For portable tables, the typical miter gauge has limited capacity and is usually not very accurate. Consequently, there is a need for a low cost miter gauge that is capable of providing highly accurate cross-cuts and that can significantly increase cutting capacity.

SUMMARY

A miter gauge assembly is provided for a table saw, the table saw having a table for supporting a workpiece thereon and at least one guide slot. The gauge assembly comprises an elongated guide bar configured for sliding engagement within a guide slot in a table, the guide bar having a side surface defining a plurality of notches therein, a miter gauge pivotably mounted to the elongated guide bar, and a locking mechanism mounted to the underside of the table for locking the miter gauge at variable positions along the length of the guide slot. The locking mechanism comprises a locking bar mounted to the underside of the table for sliding movement perpendicular to the side surface of the guide bar. The locking bar is sized and configured in a locking position for locking engagement within one of the plurality of notches. The locking mechanism further comprises a manual actuation lever accessible at one side of the table, the lever operably coupled to the locking bar so that manual movement of the actuation lever moves the locking bar to an unlocked position out of engagement with the one of the plurality of notches.

In one aspect, the manual actuation lever is movable from a first position in which the actuation lever is in the unlocked position to a different second position in which the actuation lever is in the locked position, in which the actuation lever movement is perpendicular to the direction of movement of the locking bar. The locking mechanism may further comprise a spring disposed between the locking bar and the table operable to bias the locking bar to the locked position. ## In one feature, the actuation lever includes a slot defining an angled edge, and the locking bar includes an actuation post arranged to engage the angled edge. The angled edge is configured to produce a movement of the locking bar that is perpendicular to the movement of the actuation lever.

In a further feature, the actuation lever includes an elongated actuation rod slidably supported on the underside of the table for movement perpendicular to the direction of sliding movement of the locking bar, the actuation rod including an actuation post at one end. The locking bar includes an angled slot configured to receive the actuation post for sliding movement therein. A cam lever is eccentrically pivotably engaged to an opposite end of the actuation rod, the cam lever having a cam element bearing against the underside of the table so that rotation of the cam lever relative to the actuation rod moves the actuation rod in the perpendicular direction. The angled slot is configured to produce a movement of the locking bar that is perpendicular to the movement of the actuation rod.

In another feature, the actuation lever includes an actuation rod rotatably connected to the locking bar. The actuation rod is threadedly mounted to the underside of the table so that rotation of the actuation rod causes the rod to translate in the direction of sliding movement of the locking bar. The actuation rod includes a manually engagable knob accessible at the one side of the table.

DESCRIPTION OF THE DRAWINGS

FIGS. 8a-8b are perspective and side views of the table saw shown in FIGS. 6a-6b, depicted with the sliding table extended and the miter gauge assembly locked in an extended position.

FIGS. 11a-11d are a series of views of another locking mechanism for use with the table saw of FIGS. 6a-6b.

FIG. 12 is a bottom perspective view of a further locking mechanism for use with the table saw of FIGS. 6a-6b.

FIG. 13 includes a top perspective and a bottom perspective view of another locking mechanism for use with the table saw of FIGS. 6*a*-6*b*.

DETAILED DESCRIPTION

Figure 1:
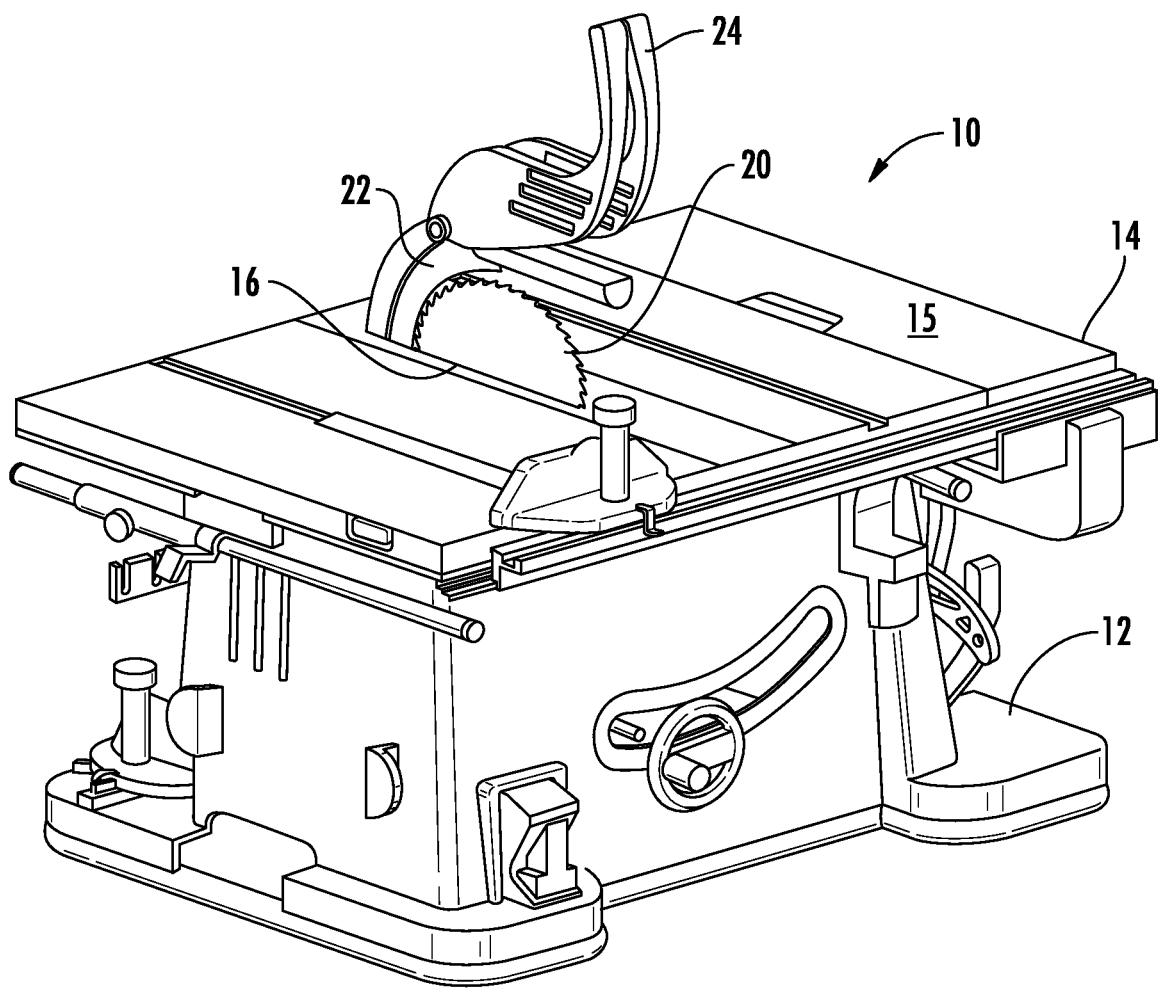
FIG. 1 is a perspective view of a table saw according to the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
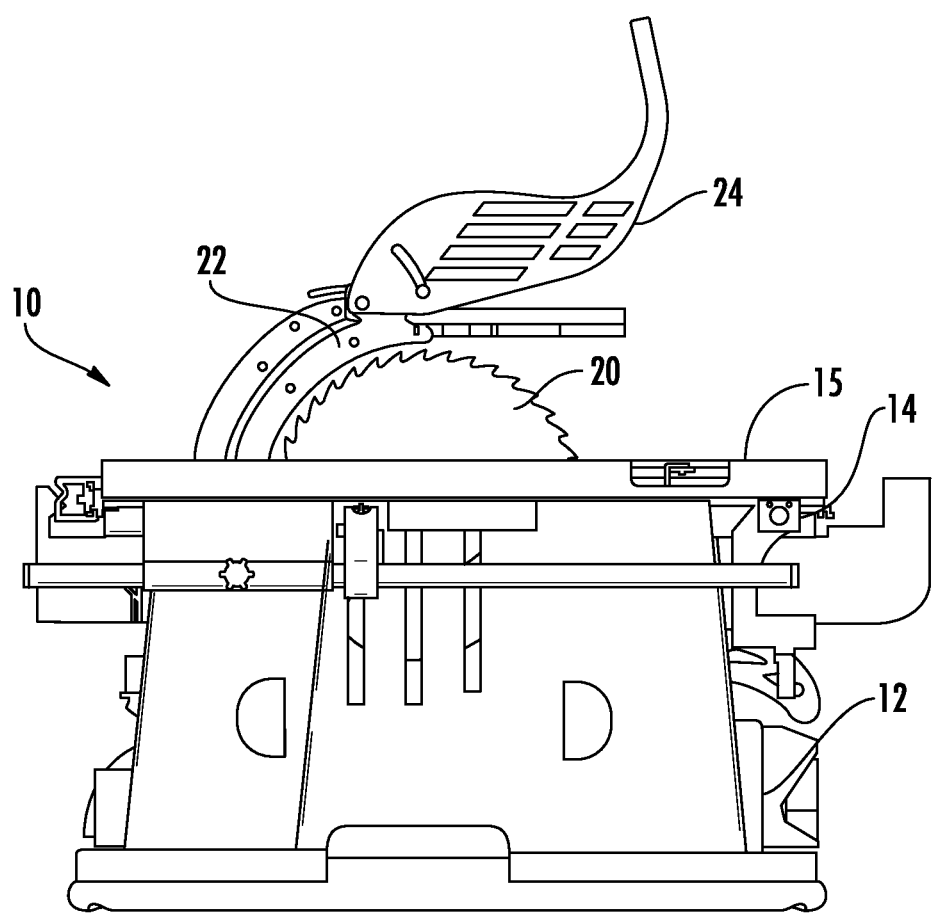
FIG. 2 is a side view of the table saw shown in FIG. 1.

A power tool, and particularly a table saw 10 is shown in FIGS. 1-2 that incorporates certain features disclosed herein. The table saw 10 includes a base 12 that is configured to be supported on a work surface and is further configured to enclose and contain the working components of the saw, as is conventional in the art. It is understood that the base 12 may be configured for portability, as shown in the figures, or may be a cabinet base that is kept in a generally fixed location. The base 12 supports a table 14 that provides the working surface 15 on which the workpiece is supported for the cutting/shaping operation. The table 14 defines a blade slot 16 for receiving a rotary saw blade 20. A riving knife assembly 22 is supported above the saw blade and a blade guard 24 may be pivotably mounted to the riving knife. The riving knife and blade guard are conventional safety features to reduce the likelihood of injury to the tool operator and to help prevent the operator from moving his/her hands into the saw blade.

Figure 3:
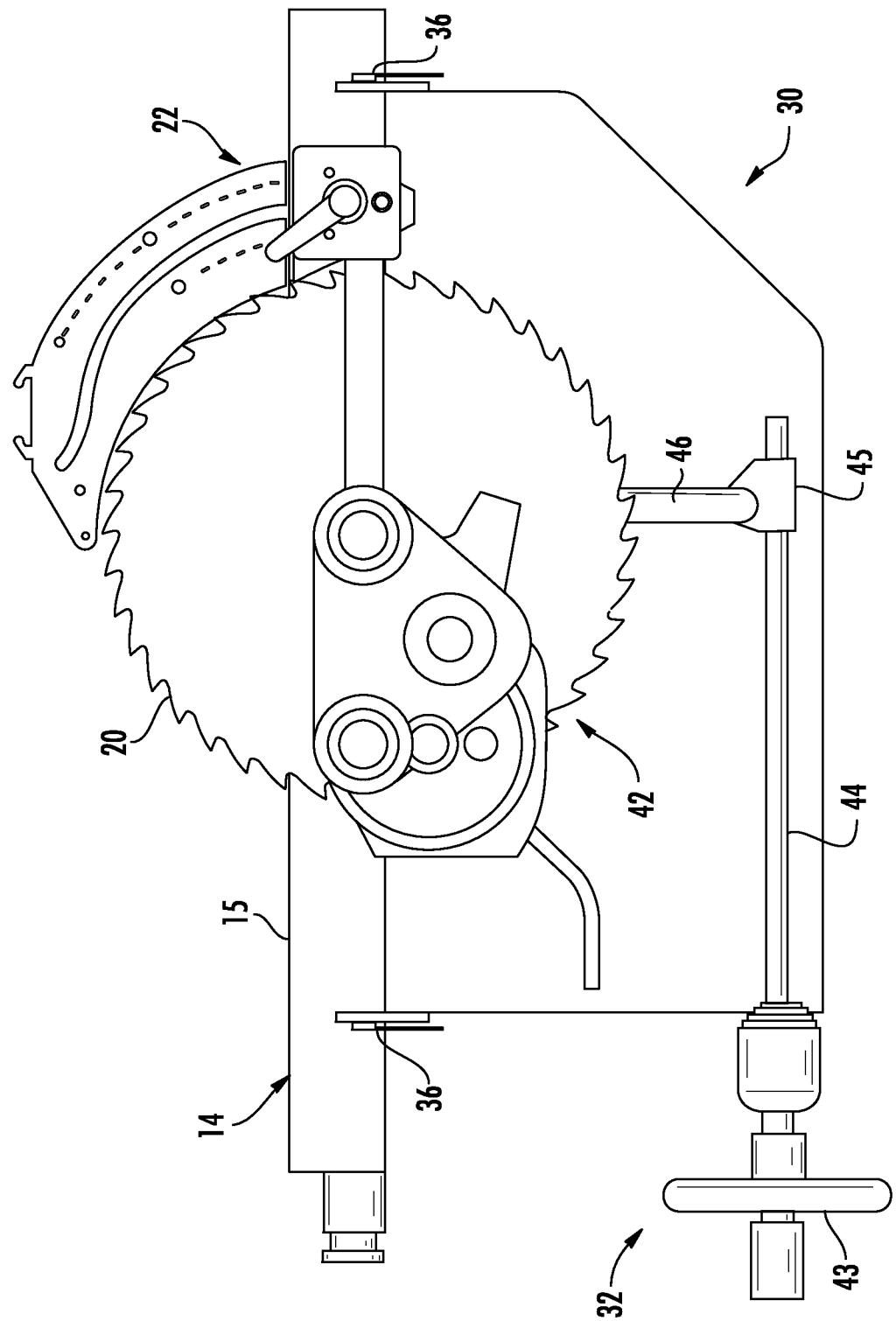
FIG. 3 is side cut-away view of the table saw shown in FIGS. 1-2 incorporating a safety mechanism and drive belt assembly according to one aspect of the disclosure, with the cutting blade in a first operating position.

A general schematic of the components of the table saw 10 is shown in FIG. 3. In particular, the table saw includes an undercarriage assembly 30 that includes an undercarriage component 34 configured to support the working components of the tool underneath the table 14. The undercarriage assembly may be supported on the table by a pair of pivot brackets 36 that allow the assembly 30 as well as the saw blade 20 to be pivoted to a desired bevel angle, as is known in the art. An elevation and bevel mechanism 32 is provided that can be used to adjust the bevel angle (or the amount of pivot about the brackets 36) as well as the height of the saw blade 20 above the surface 15 of the table. For instance, the mechanism 32 may include a hand crank 43 that can be used to rotate elevation screw 44. A nut 45 traverses the length of the elevation screw as the screw rotates. An elevation link 46 is mounted at one end to the elevation nut and at an opposite end to a drive assembly 42 that supports the saw blade. Thus, as the screw 44 is rotated in one direction the nut 45 advances toward the free end of the screw, which in turn moves the link 46 from the angled position shown in FIGS. 4-5 to the generally perpendicular position shown in FIG. 3. The elevation mechanism can thus move the saw blade from the maximum height above the work surface 15 shown in FIG. 3 to the maximum depth below the work surface shown in FIG. 5.

Figure 4:
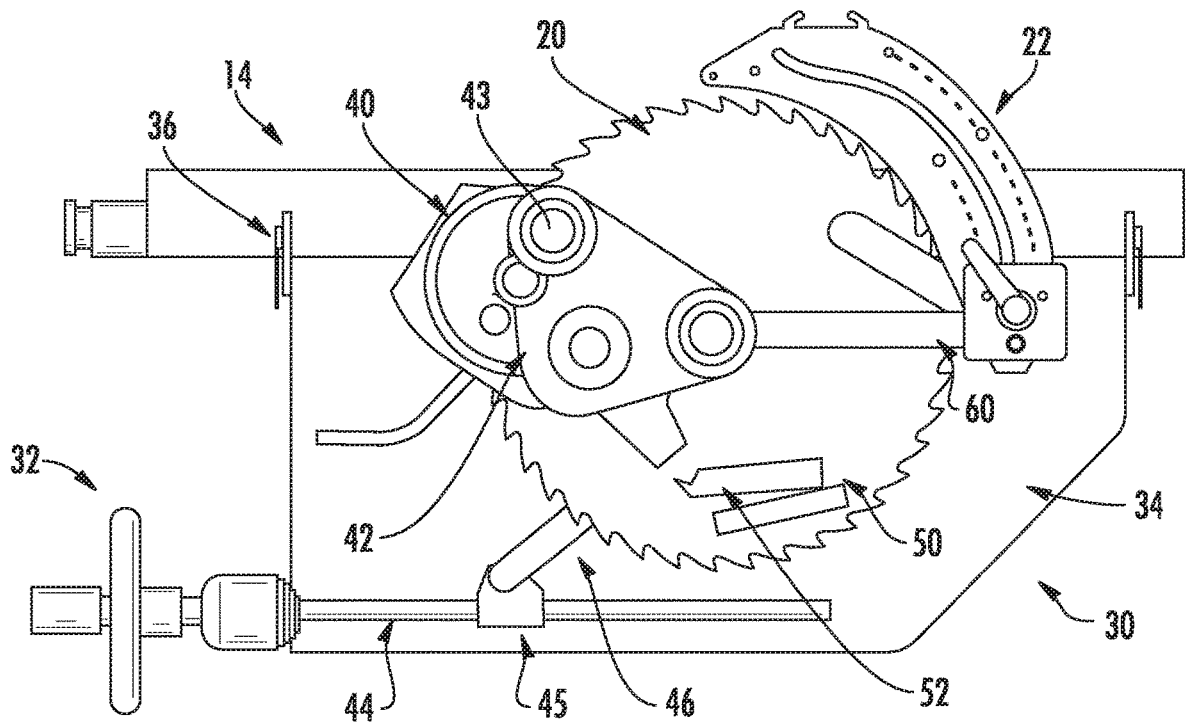
FIG. 4 is a side cut-away view of the table saw shown in FIG. 3, with the cutting blade in a second retracted position.
Figure 5:
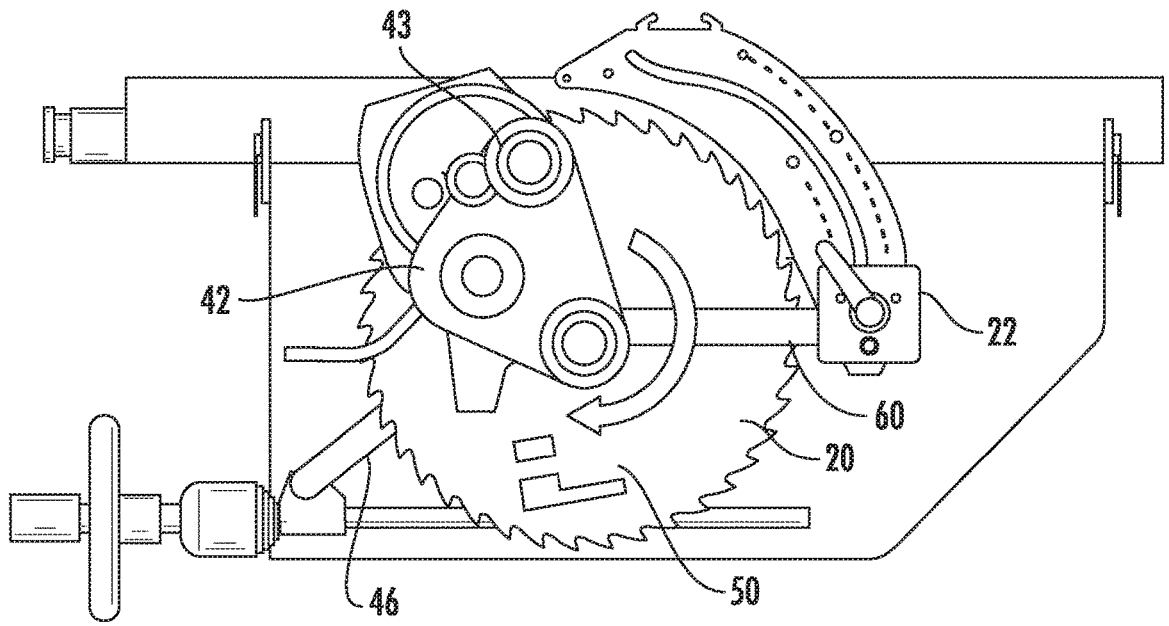
FIG. 5 is a side cut-away view of the table saw shown in FIG. 4, with the cutting blade in a further retracted position.

As further shown in FIGS. 4-5, the table saw 10 includes a belt and arm drive assembly 42 that couples the saw blade 20 to a drive motor, as described herein. In one aspect of the disclosure, the belt and arm drive assembly 42 is pivotably mounted at a pivot axis 43 to the undercarriage 34 so that the entire assembly, including the saw blade, can pivot, as depicted in FIGS. 4-5. The drive assembly 42 is connected to a riving knife linkage assembly 60 that is configured to maintain the riving knife at a consistent distance from the saw blade 20, even as the drive assembly and baled are pivoted between the maximum height and the maximum depth positions described above.

Figure 6A:
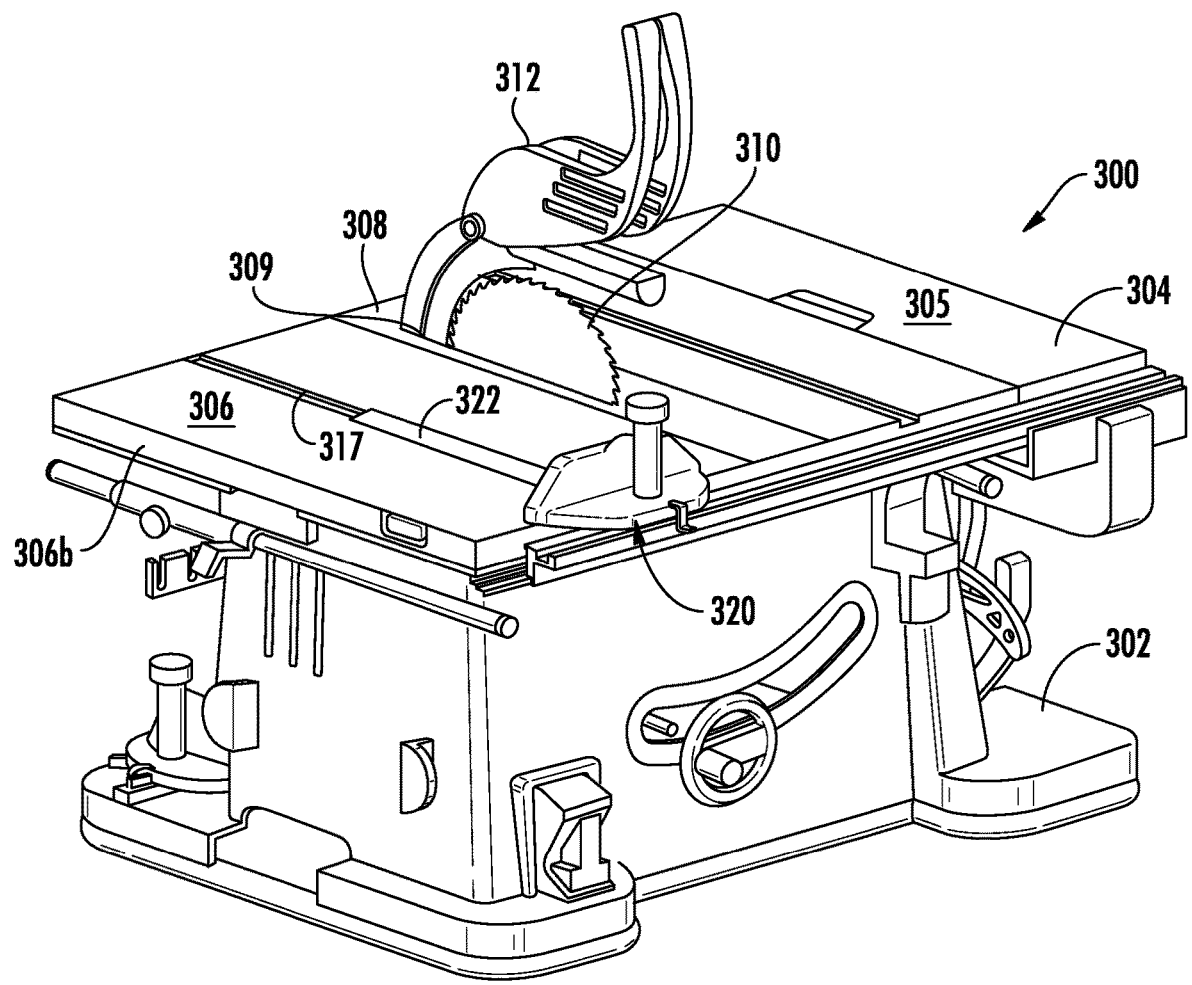
FIGS. 6a-6b are perspective and top views of a portable table saw having a sliding table feature incorporating the miter gauge assembly and locking mechanism according to one aspect of the disclosure, with the miter gauge assembly locked in an end position.
Figure 6B:
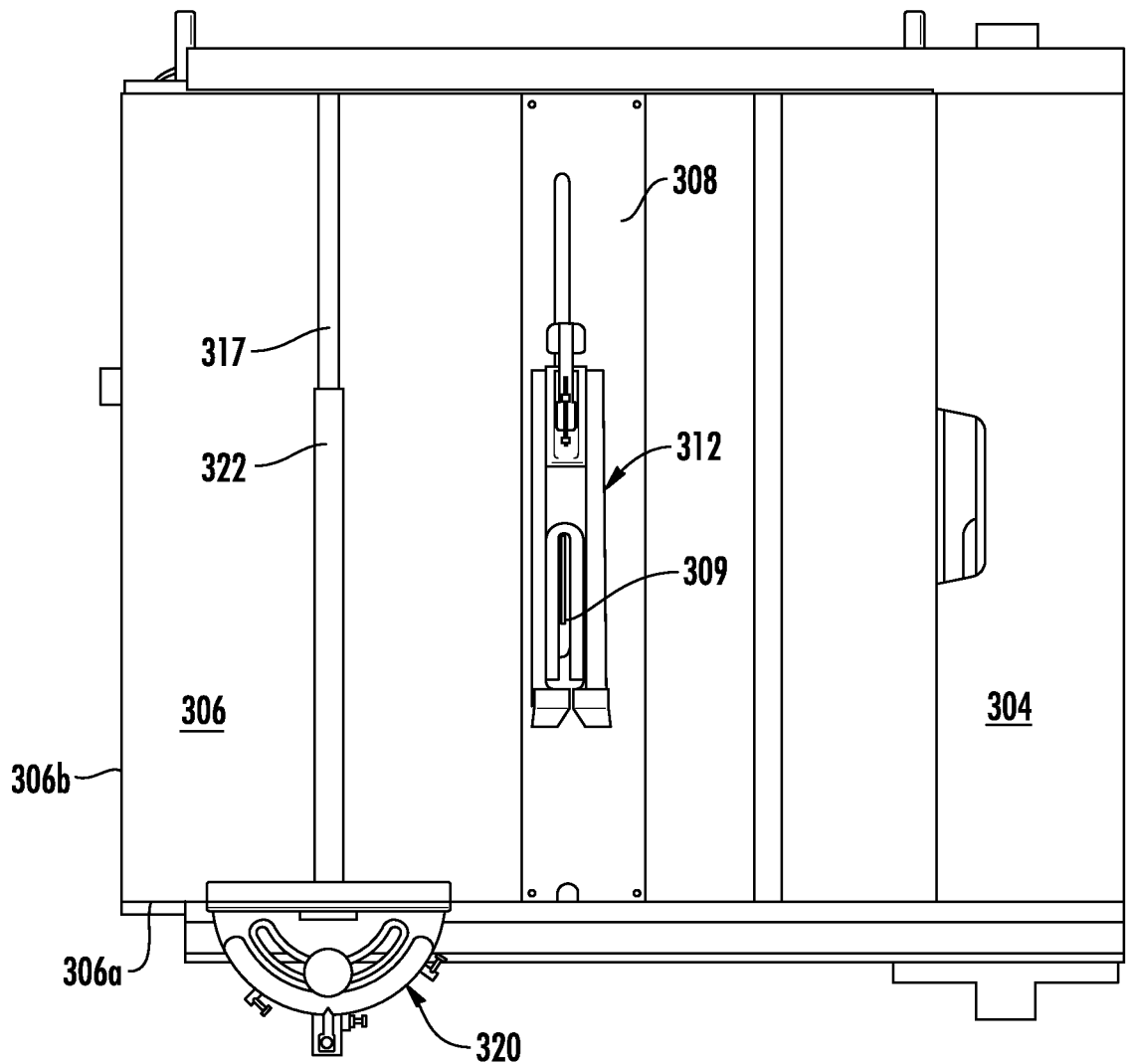
Figure 7A:
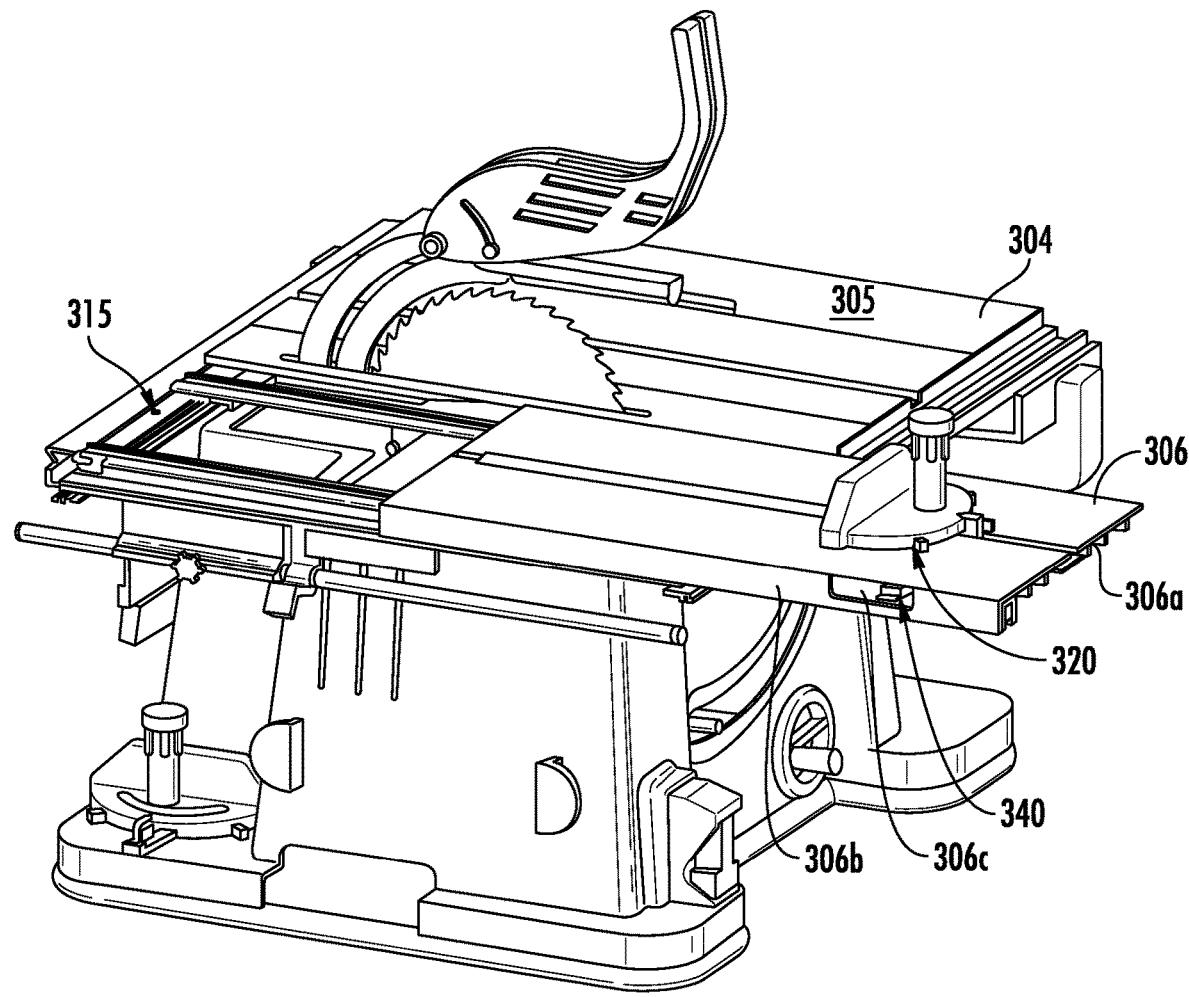
FIGS. 7a-7b are perspective and side views of the table saw shown in FIGS. 6a-6b, depicted with the sliding table extended and the miter gauge assembly locked in an inboard position.
Figure 7B:
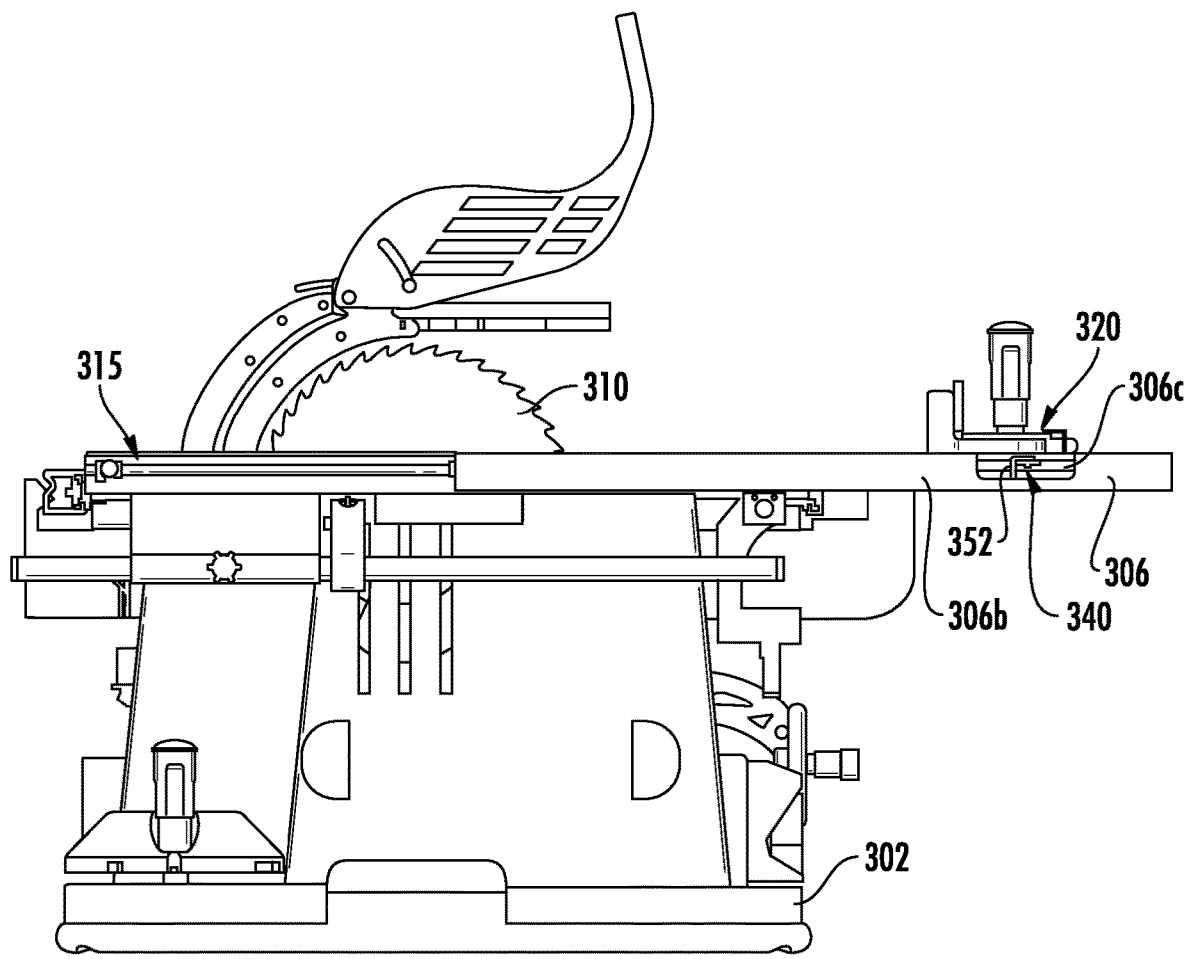

Referring now to FIGS. 6*a*-6*b*, a power table saw 300 includes a base 302 supporting a table 304 configured to provide a work surface for cutting workpieces. The table 304 includes a fixed table 305 and a sliding table 306. The table 304 further includes a throat plate 308 defining a slot 309 for the cutting blade 310. The power tool may be provided with a riving knife and blade guard assembly 312, as is known in the art. The sliding table 306 is carried on the base 302 by a sliding mechanism 315 (FIG. 7*a*) that may be of any configuration capable of allowing the table 306 to be extended away from the fixed table 305, as illustrated in FIGS. 7*a*-7*b*. In accordance with one aspect of the disclosure, a miter gauge assembly 320 is mounted to the sliding table, as described in more detail herein.

Figure 8A:
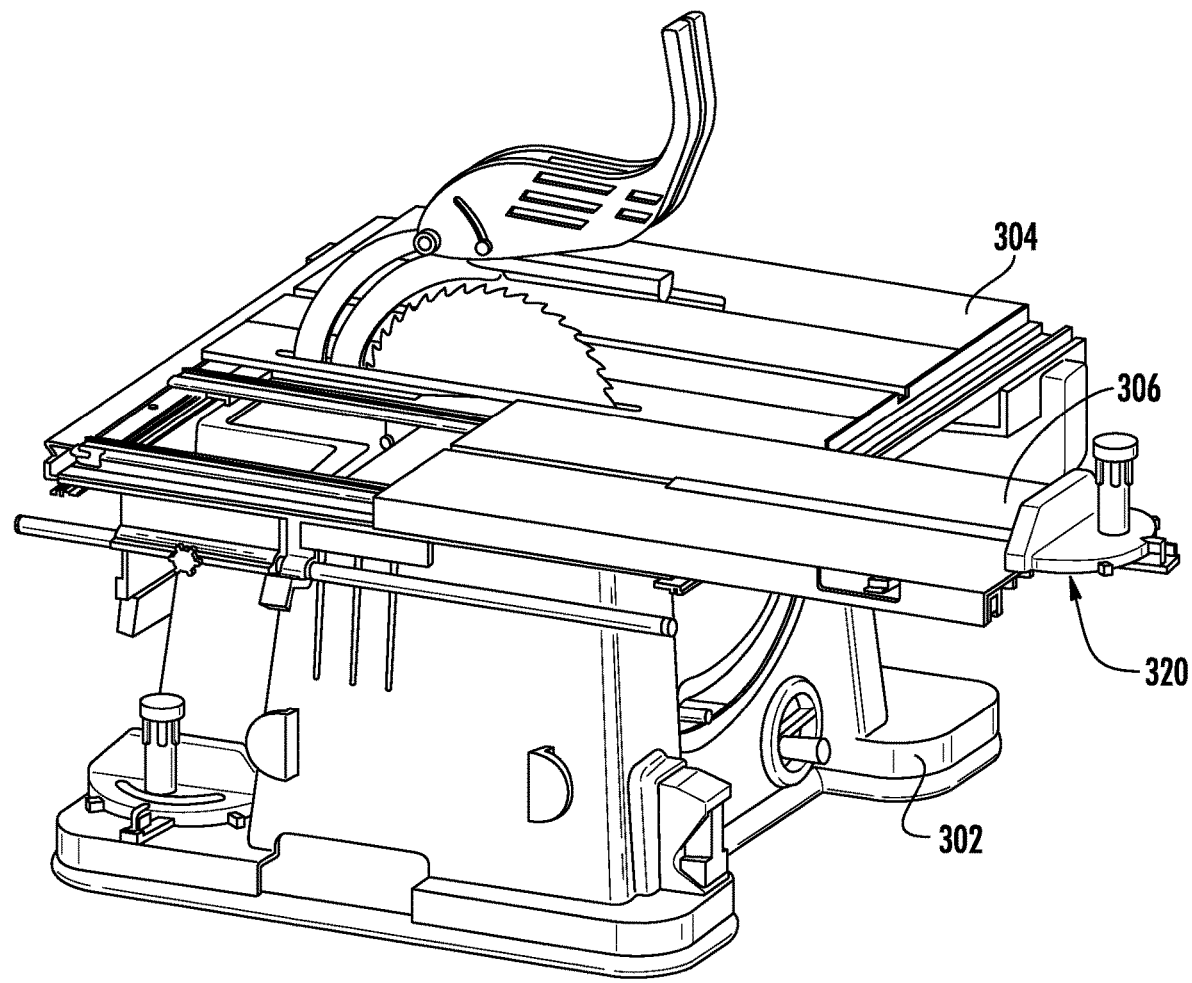

The sliding table 306 is shown in its non-extended position in FIGS. 6*a*-6*b*. The miter gauge assembly 320 is shown at the end 306*a* of the sliding table. In FIG. 7*a*-7*b*, the table 306 is shown extended out from the table 304 to accommodate a larger workpiece. In addition, the miter gauge assembly 320 is shown positioned inboard from the end 306*a*. In FIGS. 8*a*-8*b*, the miter gauge assembly 320 is shown extending beyond the end 306*a* of the sliding table, which is itself extended from the table 304. Although the miter gauge assembly is shown at a perpendicular orientation relative to the cutting blade, it is understood that the assembly can be aligned at different angles in a conventional manner.

Figure 9:
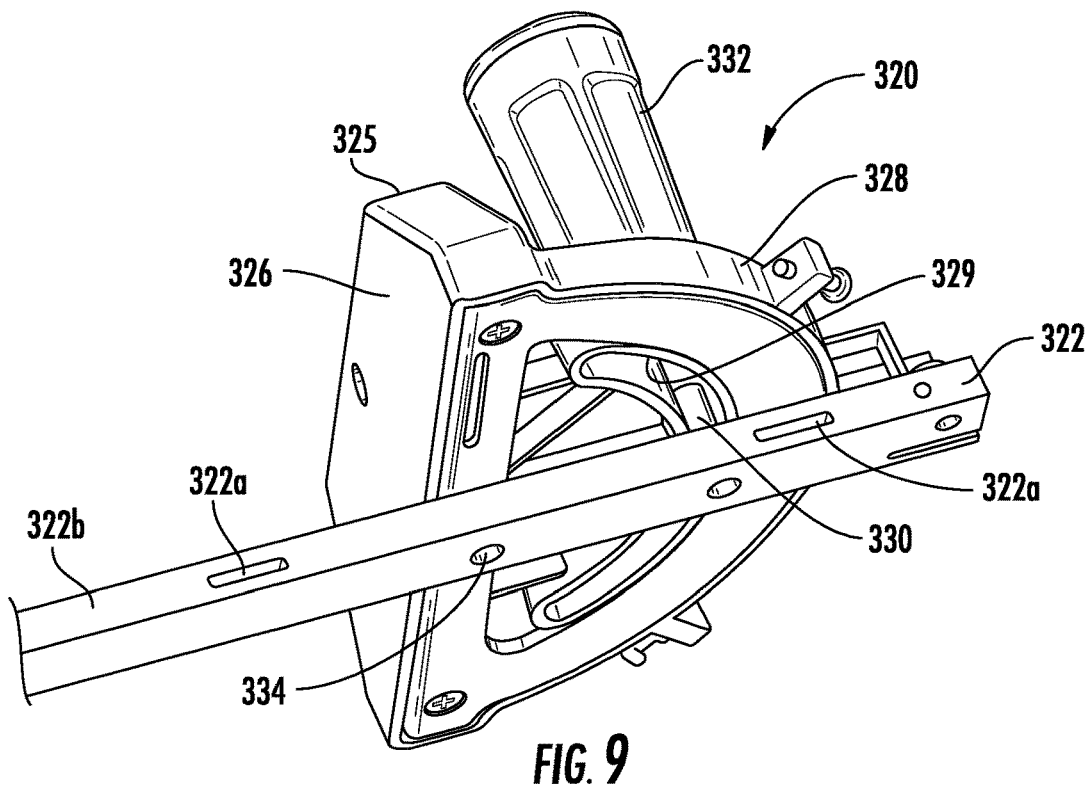
FIG. 9 is a bottom perspective view of a miter gauge assembly for use in the table saw of FIGS. 6a-6b.

One embodiment of a miter gauge for the gauge assembly 320 is shown in FIG. 9. The assembly includes an elongated guide bar 322 that is configured for sliding engagement within a guide slot 317 defined in the sliding table 316 (see, FIGS. 6*a*-6*b*). The guide bar 322 may have a length that is less than the length of the guide slot 317, but that is sufficiently long to provide adequate engagement within the guide slot 317 when the miter gauge assembly is moved to the extended position shown in FIGS. 8*a*-8*b*. A main body 325 is mounted to the guide bar 322 at a pivot mount 334. The main body defines a workpiece engagement face 326 that bears against the workpiece during the cut or shaping process. As is known, the main body 325 can be pivoted relative to the guide bar 322 so that the workpiece engagement surface 326 can be aligned at non-perpendicular angles relative to the guide bar, and thus relative to the cutting blade.

The main body 325 further includes an angle mechanism 328 with an arcuate slot 329 for receiving a miter pin 330. The miter pin 330 is fixed to the guide bar and is engaged by a locking mechanism 332 that is operable to fix the main body 325 to the guide bar at any desired angle. The miter gauge assembly 320 as thus far described may be of any conventional configuration capable of aligning a workpiece for a cross cut.

Figure 10A:
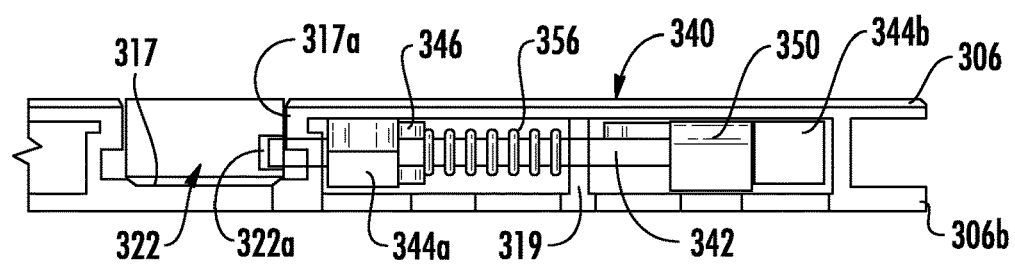
FIGS. 10a-10b are side and perspective views of a locking mechanism for use with the table saw of FIGS. 6a-6b.
Figure 10B:
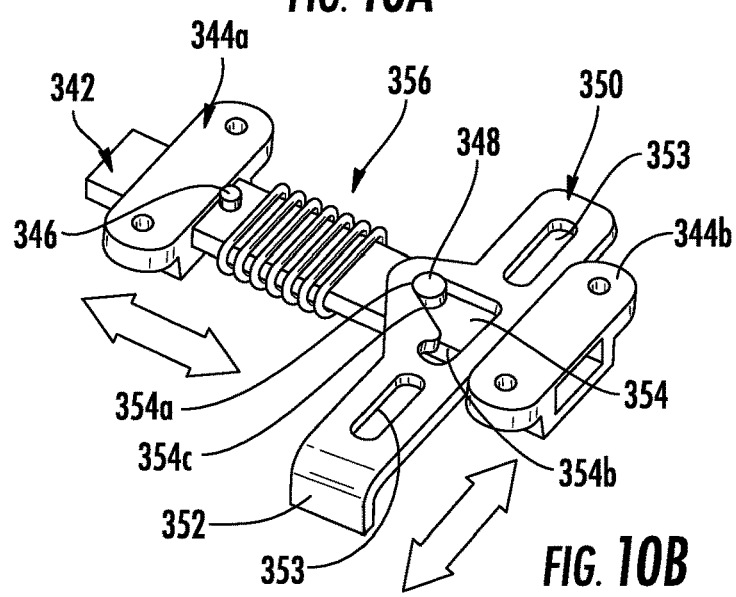

In one aspect of the disclosure, a locking mechanism 340, shown in FIGS. 10*a*-10*b*, is provided that is configured to tightly and accurately clamp the miter gauge assembly to the sliding table 316. The locking mechanism 340 is accessible from the side 306*b* of the sliding table, as illustrated in FIGS. 6*a*-8*b*. The locking mechanism 340 includes a locking bar 342 that is configured to seat within one or more correspondingly shaped notches 322*a* defined in a side surface of the guide bar 322. In one embodiment the locking bar and notches may have complementary rectangular or T-shaped configurations. The locking bar and notch are preferably sized for a close fit but with a sufficient gap between the bar and the notch to allow the bar to automatically seat within the notch under spring pressure, as described below.

The locking bar 342 is slidably mounted to the underside of the sliding table 316 by a pair of brackets 344a, 344b. The locking bar is aligned with an opening 317a in a side wall of the guide slot 317 as shown in FIG. 10a. The opening 317a is complementary configured to the locking bar 342 with sufficient clearance to allow the bar to slide through the opening with little resistance. A limit stop 346 projects from the locking bar 342 to contact the inboard bracket 344a to limit the movement of the locking bar into the locking notch 322a. The locking bar 342 further includes an actuation post 348 near the outboard end of the locking bar. The actuation post 348 is slidably engaged by an actuation lever 350, and more particularly is slidably disposed within an actuation slot 354 defined in the lever. The lever 350 includes an actuation tab 352 that can be manually engaged to slide the lever back and forth along the side 316a of the sliding table 316. In one embodiment, the actuation tab is accessible through an opening 306c defined in the side 306b of the sliding table, as illustrated in FIGS. 7a-7b. The actuation lever 350 may be slidably supported on the underside of the sliding table by suitable fasteners extending through mounting slots 353 defined in the lever.

As indicated above, the actuation post 348 is disposed within the actuation slot 354 of the lever. The actuation slot 354 includes a locking recess 354a that allows the locking bar 342 to be located at its most inboard position for engagement with the locking notch 322a. The actuation slot further includes a release recess 354b that allows the locking bar 342 to be located at its most outboard position in which it is disengaged from the locking notch 322a. An angled edge 354c connects the two recesses 354a, 354b and provides an edge surface that contacts the actuation post 348 to guide the post between the two recesses. It can be appreciated from FIG. 10b that the locking recess and release recess are at the limits of the linear movement of the action lever 350. In other words, when the lever 350 is moved to the left in FIG. 10b, the actuation post 348 travels along angled edge 354c to the locking recess 354a, and when the lever is moved to the right the angled edge 354c guides the actuation post to the release recess 354b. The angled edge 354c not only guides the post 348 to the recesses, it also applied a force to the post to push the locking bar 342 away from the guide bar 322 and notches 322a.

The locking mechanism 340 is provided with a spring 356 that biases the locking bar 342 to the locked position shown in FIGS. 10a-10b with the post 348 disposed in the locking recess 354a. The spring 356 bears against the limit stop 346 and a reaction flange 319 defined in the underside of the sliding table 316. Thus, the spring 356 maintains a constant pressure against the limit stop 346 that tends to push the locking bar 342 toward the guide bar 322 of the miter gauge assembly 340. The spring force can be overcome by manually moving the actuation lever 350 to the right in FIG. 10b so that the actuation post follows the angled edge 354c of the actuation slot 354 to the release recess 354b. In one embodiment, the release recess is configured to hold the actuation post 348 within the recess, with help from the spring 356. The operator can then adjust the position of the guide bar 322 within the guide slot 317 until the locking bar 342 is aligned with a locking notch 322a. When the bar is aligned, the operator pulls the lever 350 to the left in FIG. 10b to advance the locking bar into the notch. However, in an alternative embodiment, the release recess can be sufficiently shallow so that it is not capable of holding the post 348 against the force of the spring 356. In this configuration, the guide bar 322 may be moved once the locking bar 342 has been disengaged from one notch 322a. The spring will maintain pressure on the locking bar 342, pressing it against the side of the guide bar 322 until a new notch 322a is aligned with the locking bar, at which point the spring 356 will push the locking bar into the notch. The locking mechanism 340 thus provides an automatic locking feature that requires manual intervention to override.

The locking mechanism 340 provides a movement of the locking bar 342 that is perpendicular to the direction of the manual force applied to the actuation lever 350. The angled edge 354c thus serves as cam or linkage in that it can convert one direction of movement (i.e., the movement of the lever 350) to a perpendicular direction of movement (i.e., the movement of the locking bar 342). This relationship between the direction of the applied manual actuation force and direction of locking actuation allows the locking mechanism 380 to be contained within the perimeter of the sliding table 306, at least when the mechanism is in the locked and unlocked positions.

A locking mechanism 360 according to a further embodiment shown in FIGS. 11a-11d is configured for manual engagement from the end 306a of the sliding table 306. The locking mechanism 360 includes a locking plate 364 having a locking tab 365 that is configured to engage one of a plurality of mating locking notches 362 defined in the guide bar 322 of the miter gauge assembly 320. The locking plate is slidably supported on the underside of the sliding table by suitable fasteners extending through elongated mounting openings 367. The plate further defines an angled slot 366 that slidably receives an actuation post 370. The actuation post 370 is fixed to the end of an actuation rod assembly 372, and in particular to the end of inboard rod segment 372a. The actuation rod assembly may include an outboard rod segment 372b with the two rod segments coupled together by an adjustment nut 373. The actuation rod assembly thus operates in the manner of a turnbuckle so that rotation of the adjustment nut 373 moves the two rod segments 372a, 372b together and apart, to thereby adjust the length of the rod assembly 372. However, it is contemplated that the actuation rod assembly may include a single rod that is accurately sized so that the turnbuckle adjustment is not necessary. The rod assembly is slidably supported on the underside of the sliding table 306 by a pair of brackets 374a, 374b.

As can be appreciated from FIGS. 11e-11d, linear movement of the actuation rod assembly 372 produces perpendicular linear movement of the locking plate 364 as the actuation post 370 slides along the actuation slot 366. When the post is at the inboard end of the slot the locking plate is retracted to the unlocked position, whereas when the post is at the outboard end, the angle of the slot causes the actuation plate 364 to move to the locked position in which the tab 365 is engaged within the mating notch 362 in the guide bar 322 of the mite gauge assembly 320.

In one aspect of the locking mechanism 360, the actuation rod assembly 372 is moved linearly by pivoting movement of a cam lever 376. The cam lever includes a cam element 377 that bears against an outboard bracket 374a and is engaged to the rod segment 372b of the actuation rod assembly 372. The rod segment 372b is eccentrically engaged to the cam element 377 at a pivot pin 372c. The cam element 377 is configured so that the rod assembly translates as the cam lever 376 is pivoted. In one position, with the cam lever 376 facing to the right as shown in FIG. 11c, the pivot pin 372c is at its farthest position away from the locking plate 364 so that rod segment 372b and the actuation rod assembly are moved outboard away from the locking plate. With this movement, the actuation post 370 travels to the outboard end of the slot 366 which causes the locking plate 365 to travel to the left (in FIG. 11c) and into the locked position. As the cam lever is pivoted to the left, as shown in FIG. 11d, the eccentric position of the pivot pin 372c pushes the rod assembly inward toward the locking plate. This movement causes the actuation post 370 to travel to the inboard end of the slot 366. Since the slot is angled, this movement pushes the locking plate to the left so that the tab 365 is disengaged from the notch 362, placing the locking mechanism in the unlocked position. A biasing spring 378 may be provided between the inboard bracket 374b and the adjustment nut 373 to provide a force that biases the actuation rod assembly 372 and the locking plate 374 to the locked position. As shown in FIG. 11b, the locking mechanism 360 is configured so that the lever 376 is contained within the perimeter of the sliding table 316, at least in the locked and unlocked positions.

A locking mechanism 380 may also be used to lock the miter gauge assembly 315. As shown in FIG. 12, the locking mechanism 380 includes an actuator rod 382 that is threaded into an actuator plate 383. The actuator plate 383 is configured to engage an actuator notch in the guide bar 322, such as the notch 322a utilized by the locking mechanism 340 FIG. 10a). The rod is rotatably supported by a bracket 386a mounted to the underside of the sliding table 306, while the actuator plate 383 is slidably supported by a bracket 386b mounted to the sliding table. Rotation of the actuator rod 382 advances or retracts the plate 383 relative to the locking notch in the guide bar. The actuator rod 382 may include a knob 385 projecting through the opening 306c in the side 306b of the sliding table. The knob is configured for manual rotation by the tool operator to lock and unlock the locking mechanism from the miter gauge guide bar. In this embodiment, it may be desirable to have the knob 385 extend slightly outside the perimeter of the sliding table 306 so that the knob can be readily manually engaged.

The locking mechanism 390 shown in FIG. 13 is a modification of the mechanism 340 described above in connection with FIGS. 10a-10b. The locking mechanism 390 includes a locking bar 392 that can be configured and function like the locking bar 342 of the prior described mechanism. The locking bar is supported on the underside of the sliding table 306 by brackets 394 and includes a limit stop 396 and actuation post 398 that have the same function and operation as the like-named components in the prior described mechanism. More specifically, the actuation post 398 engages an actuation slot 404 within an actuation lever 400. The slot 404 includes a locking recess 404a and a release recess 404b for positioning the locking bar 392 in the appropriate position relative to the guide bar 322 of the miter gauge assembly 320. The actuation lever 400 is slidably mounted to the underside of the sliding table by appropriate fasteners extending through the mounting slot 403. The actuation lever 400 includes an actuation tab 402 that extends through the opening 306c in the side 306a of the sliding table. The actuation tab 402 is used in the same manner as the tab 352 but is configured to extend perpendicularly outward from the actuation lever 400, as depicted in FIG. 13. A spring 406 is provided to bias the locking bar 392 to its locking position. Moving the lever 400 to the right in FIG. 13 compresses the spring 406 and moves the locking bar 392 to the release position to release the guide bar 322 and allow the position of the miter gauge assembly 320 to be adjusted.

Figure 14A:
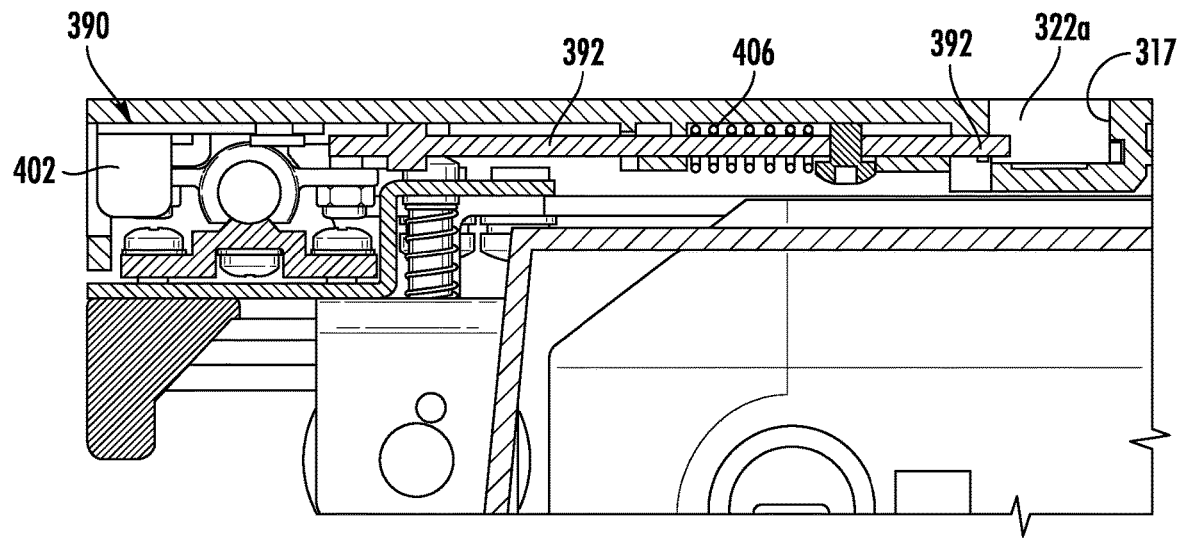
FIGS. 14*a*-14*c* are side and perspective cut-away views of the locking mechanism of FIG. 13 integrated with the table saw and miter gauge assembly shown in FIGS. 41*a*-6*b*.
Figure 14B:
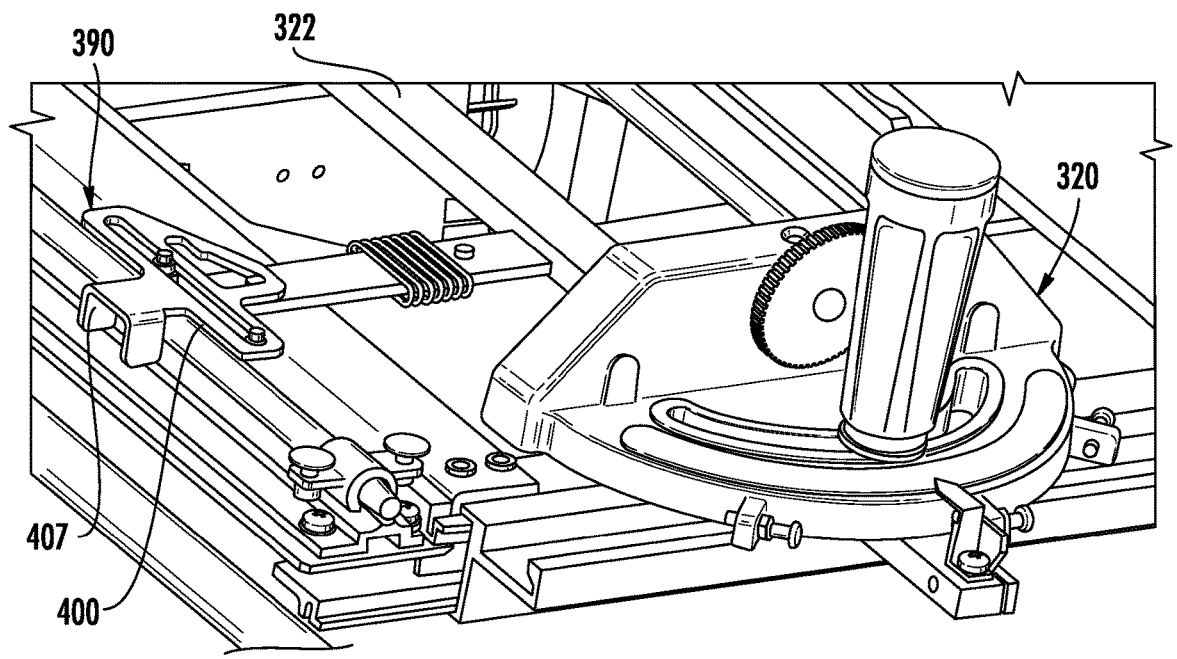
Figure 14C:
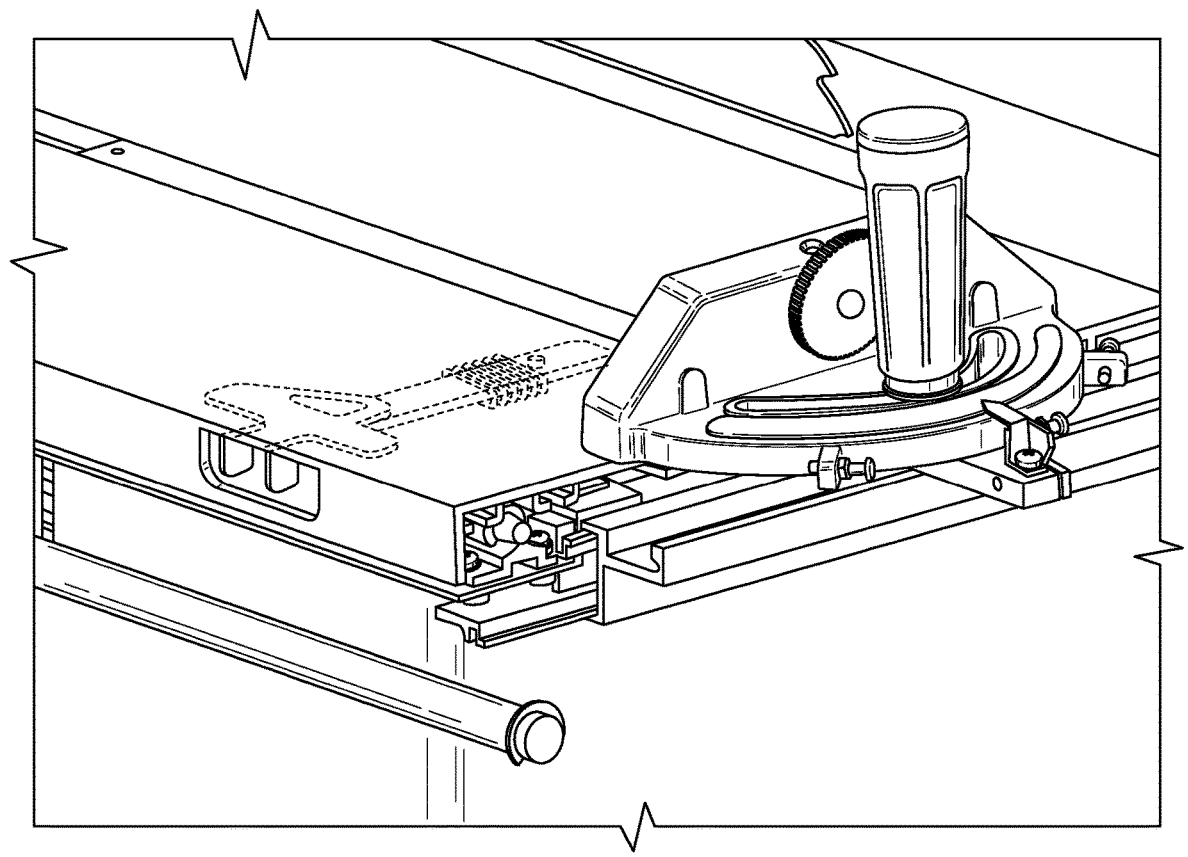

FIGS. 14a-c and FIG. 15 show the locking mechanism 390 integrated within a sliding table 306 and arranged to engage the miter gauge assembly 320. It is noted that FIG. 14b depicts a modified tab 407 for the actuation lever 400. Rather than a single tab, such as the tab 402 (FIG. 14a) the tab 407 includes two tab structures spaced apart for finger or thumb access.

The locking mechanisms 340, 360, 380 and 390 provide a simple yet sturdy mechanism for locking the position of a miter gauge assembly to a sliding table of a table saw. The mechanisms are biased to a locking position and this bias can provide a sensible indication that the lock has been engaged. The locking mechanisms are configured to engage the guide bar of the miter gauge assembly at different locations along the length of the guide bar, particularly by engaging a series of spaced apart engagement notches. The locking mechanism thus allows the miter gauge assembly to be locked at several positions along the length of the sliding table, from a fully inboard position to a position in which the miter gauge assembly projects beyond the end of the sliding table. The locking mechanism is provided in different embodiments with manually actuated components that can be push/pull, pivoting, rotating or sliding. In addition, locking mechanisms in different embodiments may be accessed from the side or from the front of the sliding table.

What is claimed is:

1. A miter gauge assembly for a table saw, the table saw having a table for supporting a workpiece thereon, the table defining a saw blade slot configured to receive a saw blade therethrough and at least one guide slot defined in and extending along the table parallel to the saw blade slot, the table further defining an opening to the at least one guide slot at one end of the table, the miter gauge assembly comprising:
   an elongated guide bar configured for sliding engagement within the at least one guide slot, the elongated guide bar having a side surface defining a plurality of notches therein;
   a miter gauge pivotably mounted to the elongated guide bar; and
   a locking mechanism mountable to an underside of the table and configured to lock the elongated guide bar at a selected position within the at least one guide slot, the locking mechanism including;
      a locking bar mountable to the underside of the table for linear sliding movement in a direction perpendicular to the side surface of the elongated guide bar, the locking bar sized and configured in a locking position to pass through the opening to the guide slot and for locking engagement within one of the plurality of notches, and including an angled slot angled relative to the direction of linear sliding movement of the locking bar;
      a manual actuation lever accessible at one side of the table, the lever operably coupled to the locking bar so that manual movement of the actuation lever moves the locking bar to an unlocked position out of engagement with the one of the plurality of notches, the actuation lever connected to an elongated actuation rod slidably supported on the underside of the table for movement perpendicular to the direction of linear sliding movement of the locking bar, the actuation rod including an actuation post at one end configured and arranged to be received within said angled slot in said locking bar;

wherein the angled slot is configured to produce said linear sliding movement of the locking bar that is perpendicular to the movement of the actuation rod.

2. The miter gauge assembly of claim 1, wherein the manual actuation lever is movable from a first position in which the actuation lever is in the unlocked position to a different second position in which the actuation lever is in the locked position.

3. The miter gauge assembly of claim 2, wherein the locking mechanism further comprises a spring disposed between the locking bar and the table operable to bias the locking bar to the locked position.

4. The miter gauge assembly of claim 1, wherein the actuation lever comprises a cam lever eccentrically pivotably engaged to an opposite end of the actuation rod, the cam lever having a cam element bearing against the underside of the table so that rotation of the cam lever relative to the actuation rod moves the actuation rod in the perpendicular direction.

5. The miter gauge assembly of claim 1, wherein the elongated guide bar includes at least one notch positioned so that the miter gauge extends beyond the end of the table when the elongated guide bar is locked to the table by the locking mechanism.

6. The miter gauge assembly of claim 1, wherein an opening is provided in the one side of the table, the opening sized to permit manual access to the manual actuation lever through the opening.

7. A table assembly for a table saw comprising:
a table for supporting a workpiece thereon, the table defining a saw blade slot configured to receive a saw blade therethrough and defining at least one guide slot extending along the table parallel to the saw blade slot, the table further defining an opening to the at least one guide slot at one end of the table;
a miter gauge assembly including;
an elongated guide bar having a side surface defining a plurality of notches therein and configured for sliding engagement within the at least one guide slot to selectively align one of the plurality of notches with the opening to the guide slot;
a miter gauge pivotably mounted to the elongated guide bar; and
a locking mechanism mounted to an underside of the table and configured to lock the elongated guide bar at a selected position within the at least one guide slot, the locking mechanism including;
a locking bar mounted to the underside of the table for sliding linear movement in a direction perpendicular to the side surface of the elongated guide bar, the locking bar sized and configured in a locking position to pass through the opening to the guide slot and for locking engagement within one of the plurality of notches of the elongated guide bar, the locking bar including an angled slot angled relative to the direction of linear siding movement of the locking bar;

a manual actuation lever accessible at one side of the table, the lever operably coupled to the locking bar so that manual movement of the actuation lever moves the locking bar to an unlocked position out of engagement with the one of the plurality of notches, the actuation lever connected to an elongated actuation rod slidably supported on the underside of the table for movement perpendicular to the direction of linear sliding movement of the locking bar, the actuation rod including an actuation post at one end configured and arranged to be received within said angled slot in said locking bar;

wherein the angled slot is configured to produce said linear sliding movement of the locking bar that is perpendicular to the movement of the actuation rod.

8. The table assembly of claim 7, wherein the manual actuation lever is movable from a first position in which the actuation lever is in the unlocked position to a different second position in which the actuation lever is in the locked position.

9. The table assembly of claim 8, wherein the locking mechanism further comprises a spring disposed between the locking bar and the table operable to bias the locking bar to the locked position.

10. The table assembly of claim 7, wherein the actuation lever comprises a cam lever eccentrically pivotably engaged to an opposite end of the actuation rod, the cam lever having a cam element bearing against the underside of the table so that rotation of the cam lever relative to the actuation rod moves the actuation rod in the perpendicular direction.

11. The table assembly of claim 7, wherein the elongated guide bar includes at least one notch positioned so that the miter gauge extends beyond the end of the table when the elongated guide bar is locked to the table by the locking mechanism.

12. The table assembly of claim 7, wherein an opening is provided in the one side of the table, the opening sized to permit manual access to the manual actuation lever through the opening.

\* \* \* \* \*